(12) United States Patent
Nicholes et al.

(10) Patent No.: US 7,512,956 B1
(45) Date of Patent: Mar. 31, 2009

(54) SYSTEM AND METHOD FOR SUPPORTING NON-STANDARD PROCEDURE CALLS

(75) Inventors: Martin O. Nicholes, Antelope, CA (US); Sam Arthur Miller, Chicago, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 10/640,765

(22) Filed: Aug. 14, 2003

(51) Int. Cl.
*G06F 9/46* (2006.01)
(52) U.S. Cl. .................... 719/328; 719/330; 709/250
(58) Field of Classification Search ............. 719/328, 719/318, 322, 323, 327, 310, 330; 713/100; 703/23, 26, 27; 712/226; 711/200, 202, 711/203; 345/530–574; 709/217, 218, 219, 709/250
See application file for complete search history.

(56) References Cited

U.S. PATENT DOCUMENTS

| | | | | |
|---|---|---|---|---|
| 5,327,562 | A * | 7/1994 | Adcock | 717/141 |
| 5,796,984 | A * | 8/1998 | Pearce et al. | 703/24 |
| 5,829,012 | A * | 10/1998 | Marlan et al. | 711/102 |
| 5,991,822 | A * | 11/1999 | Mealey et al. | 719/327 |
| 6,263,491 | B1 * | 7/2001 | Hunt | 717/130 |
| 2002/0019887 | A1 * | 2/2002 | Moore | 709/328 |
| 2002/0169979 | A1 * | 11/2002 | Zimmer | 713/200 |
| 2005/0102129 | A1 * | 5/2005 | Bond et al. | 703/26 |

OTHER PUBLICATIONS

"Java 2 Platform SE v1.3: Class LinkedList." Stored at <http://web.archive.org/web/20001205235900/http://java.sun.com/j2se/1.3/docs/api/java/util/LinkedList.htm l> Aug. 23, 2000. Accessed Oct. 12, 2003.*
U.S. Appl. No. 10/414,701, Culter et al.
Intel, "Intel Itanium Architecture Software Developer's Manual", vol. 2, System Architecture, Rev. 2.0, Dec. 2001, Document 245318-003. Title page, publication page, table of contents and Section 11.1 Firmware Model, pp. 2:253-2:263 provided. Complete document will be provided upon request).

* cited by examiner

*Primary Examiner*—Van H Nguyen

(57) ABSTRACT

According to at least one embodiment of the present invention, a system comprises a standard interface for at least one standard procedure. The system further comprises a non-standard interface for at least one non-standard procedure that is not natively supported by the standard interface. The system also comprises an interposer for intercepting procedure calls made to the standard interface and determining whether an intercepted procedure call is for invoking one of the at least one standard procedure or for invoking one of the at least one non-standard procedure. If the intercepted procedure call is for invoking one of the at least one standard procedure the interposer directs the intercepted procedure call to the standard interface, and if the intercepted procedure call is for invoking one of the at least one non-standard procedure the interposer directs the intercepted procedure call to the non-standard interface.

15 Claims, 5 Drawing Sheets

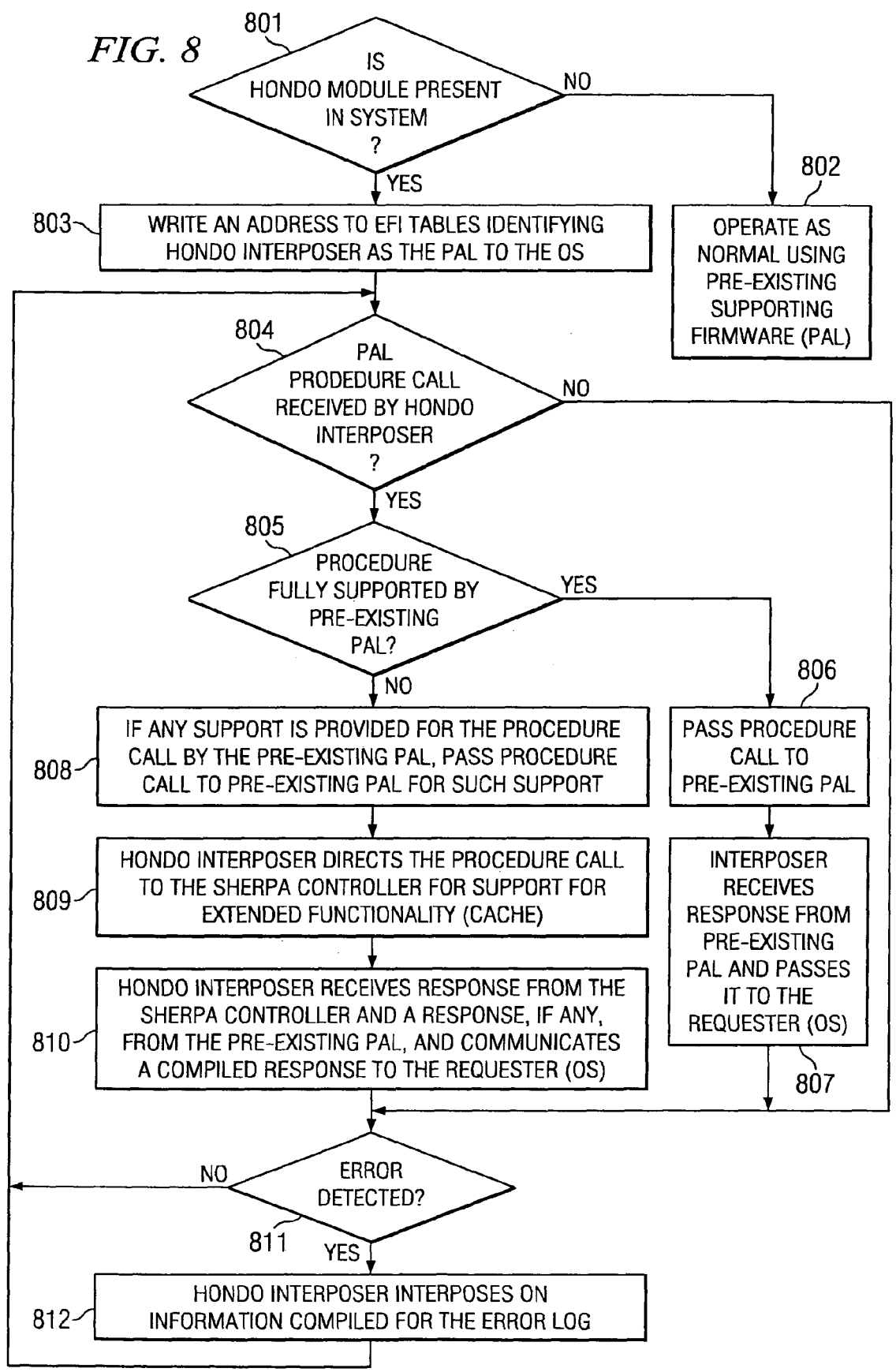

SYSTEM AND METHOD FOR SUPPORTING NON-STANDARD PROCEDURE CALLS

BACKGROUND

The complexity, capacity, and intelligence of computer systems is ever evolving. Industry standards are often developed in an attempt to provide a degree of compatibility between computer systems and/or their functional components. For instance, various processor architectures are known in the art, such as the PA-RISC family of processors developed by HEWLETT-PACKARD Company ("HP"), INTEL Corporation's (INTEL) architecture (IA) processors (e.g., the well-known IA-32 and IA-64 processors), and the like. As is well-known, IA-64 is a 64-bit processor architecture co-developed by HP and INTEL, which is based on Explicitly Parallel Instruction Computing (EPIC). ITANIUM is the first microprocessor based on the IA-64 architecture. Developed under the code name of MERCED, ITANIUM and its underlying architecture provide a foundation for software for various platforms, including without limitation the server and high-end workstation platforms.

In addition to supporting a 64-bit processor bus and a set of 28 registers, the 64-bit design of ITANIUM allows access to a very large memory (VLM) and exploits features in EPIC. Features of ITANIUM provide advances in the parallel processing handling of computer instructions known as predication and speculation. An additional ITANIUM feature includes a Level 3 (L3) cache memory, to supplement the current L1 and L2 cache memories found in most of today's microcomputers. Other IA-64 microprocessors have followed ITANIUM, including those having the code names of MCKINLEY and MADISON.

Processor architecture generally comprises corresponding supporting firmware. For example, the IA-64 processor architecture comprises such supporting firmware as Processor Abstraction Layer (PAL), System Abstraction Layer (SAL), and Extended Firmware Interface (EFI). Such supporting firmware may enable, for example, the Operating System (OS) to access a particular function implemented for the processor. For instance, the OS may query the PAL as to the size of the cache implemented for the processor, etc. Other well-known functions provided by the supporting firmware (SAL, EFI) include, for example: (a) performing input/output ("I/O") configuration accesses to discover and program the I/O Hardware (SAL_PCI_CONFIG_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported.

Generally, if new functionality is provided in a processor, its supporting firmware is revised to support such new functionality. For example, if a new cache is implemented in a processor, its supporting firmware, such as its PAL, is typically modified to support the new cache, e.g., by modifying the PAL interface to support additional procedure calls relating to the new cache. Further, for certain changes to a processor, the OS with which the processor is to be used may need to be modified to recognize those changes. For instance, the OS may need to have new procedure calls implemented for accessing new features implemented in a processor. Thus, as developers expand the functionality of their processors, they generally implement new supporting firmware and/or modify the OS to recognize the new functionality.

SUMMARY

According to at least one embodiment of the present invention, a system comprises a standard interface for at least one standard procedure. The system further comprises a non-standard interface for at least one non-standard procedure that is not natively supported by the standard interface. The system also comprises an interposer for intercepting procedure calls made to the standard interface and determining whether an intercepted procedure call is for invoking one of the at least one standard procedure or for invoking one of the at least one non-standard procedure. If the intercepted procedure call is for invoking one of the at least one standard procedure the interposer directs the intercepted procedure call to the standard interface, and if the intercepted procedure call is for invoking one of the at least one non-standard procedure the interposer directs the intercepted procedure call to the non-standard interface.

According to certain embodiments, a method is provided that comprises intercepting a procedure call intended for a first interface that supports standard procedures. The method further comprises determining from the intercepted procedure call whether the intercepted procedure call is for invoking one of the standard procedures or whether the intercepted procedure call is for invoking a non-standard procedure that is not supported by the first interface. If determined that the intercepted procedure call is for invoking one of the standard procedures, the method comprises directing the intercepted procedure call to the first interface. If determined that the intercepted procedure call is for invoking the non-standard procedure, the method comprises directing the intercepted procedure call to a second interface that supports the non-standard procedure.

According to certain embodiments, a method of obscuring procedure calls is provided. The method comprises predefining at least one special index that identifies a non-standard procedure that is not supported by a standard interface, wherein the at least one special index is different than standard indices that identify standard procedures supported by the standard interface. The method further comprises including an index in a procedure call intended for the standard interface, wherein the index identifies a procedure to be invoked. The method also comprises intercepting procedure calls intended for the standard interface, and determining whether a special index is included in an intercepted procedure call. If determined that a special index is included in the intercepted procedure call, the method comprises directing the intercepted procedure call to a non-standard interface that supports a non-standard procedure identified by such special index included in the intercepted procedure call.

According to certain embodiments, a system comprises at least one processor, and a Processor Abstraction Layer (PAL) interface for supporting standard PAL procedures. The system further comprises a non-standard interface for accessing at least one non-standard procedure that is not natively supported by the PAL interface. The system also comprises an interposer for intercepting procedure calls made to the PAL interface and determining whether an intercepted procedure call is for invoking one of the standard PAL procedures or for invoking one of the at least one non-standard procedure, wherein if the intercepted procedure call is for invoking one of the standard PAL procedures the interposer directs the intercepted procedure call to the PAL interface and wherein if the intercepted procedure call is for invoking one of the at least one non-standard procedure the interposer directs the intercepted procedure call to the non-standard interface.

BRIEF DESCRIPTION OF THE DRAWINGS

FIG. 8 shows an example operational flow diagram of one embodiment of the present invention;

DETAILED DESCRIPTION

Figure 1:
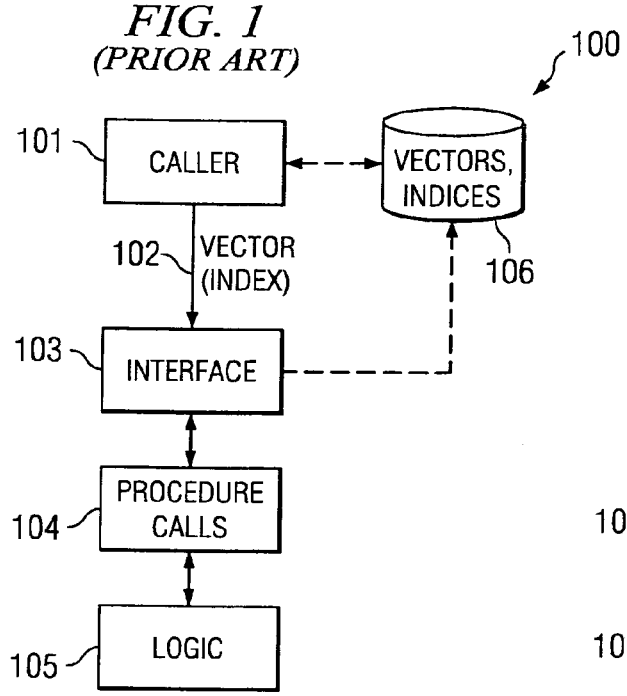
FIG. 1 shows an example block diagram of a traditional system in which a standard interface is implemented, which provides access to standard, published procedure calls supported thereby.

Many environments and/or logic have standard, well-defined interfaces that support published procedure calls. For instance, published indices that each identify a procedure call supported by an interface may be used by a caller desiring to invoke a supported procedure call by passing the appropriate index to a known vector associated with the interface. From time-to-time, it may be desirable to add new procedure calls that are supported by the interface. However, a developer desiring to add the new procedure calls may be unable and/or unwilling (e.g., due to legal restrictions) to modify the interface to support the new procedure calls.

Embodiments of the present invention enable an expansion to the procedure calls supported by an interface without modifying the interface. More specifically, new procedure calls that are not supported by a standard interface may be added, and an interposer may be implemented to intercept calls made to the standard interface and support the new procedure calls such that the standard interface is not required to be modified. According to one embodiment of the present invention, the vector of an interface is directed to an interposer, rather than the interface, such that the interposer intercepts indices passed to such vector. The interposer analyzes an intercepted index to determine whether it is for a standard procedure call that is supported by the interface, in which case the interposer passes the index to the interface.

Certain indices are defined as "special." When received by the interposer, the special indices enable access to new procedure calls that are not supported by the standard interface. Thus, when analyzing an intercepted index, if the interposer identifies the index as a pre-defined "special" index, the interposer determines the new procedure call identified by the special index and invokes such procedure call. Thus, the interception of the procedure call by the interposer is transparent to the caller and the interface. That is, when making a standard procedure call that is supported by the interface, it appears to the caller that such procedure call is being made to and being supported by the standard interface (the interception of the call by the interposer is transparent to both the caller and the standard interface). Further, when making a call to an added procedure call that is not supported by the standard interface (e.g., using the "special index"), it appears to the caller that such added procedure call is being supported by the standard interface.

As described further below, in some cases it is desirable to obscure the newly added procedure calls. Certain embodiments of the present invention utilize a "special" index for calling newly added procedure calls in a manner that aids in obscuring such newly added procedure calls. For instance, while it appears to a caller that the newly added procedure calls are supported by the standard interface, the newly added procedure calls are not readily identifiable from an analysis of the standard interface. Further, from an analysis of the standard interface, the technique for accessing/invoking the newly added procedure calls is not readily identifiable. In certain embodiments, a pseudo-random base number is selected for the "special" indices, wherein each unique, newly added procedure call is assigned some offset from the pseudo-random base number. Such "pseudo-random base+assigned offset" for a procedure call is used as the index, which the interposer can recognize as identifying the corresponding procedure call. This technique of using indices for calling certain procedure calls that are not supported by the standard interface aids in obscuring those procedure calls to one (e.g., a competitor) analyzing the system. Thus, it is not readily identifiable how the functionality of the added procedure calls is made available in the system, as the standard interface remains unmodified.

As an example in which embodiments of the present invention may be utilized, in many situations it becomes desirable for a developer to expand the functionality of logic (e.g., a processor) without altering the pre-existing supporting firmware of the logic. Further, it may be desirable to expand the functionality of logic, such as a processor, without altering the OSs that support such logic. For example, in an IA-64 (or other IA), it may be desirable to extend the functionality of the processor(s) implemented in a system without requiring modification to the pre-existing IA-64 supporting architectural components, such as PAL, SAL, or the OS.

As described further below, functionality of a processor (or other logic) may be expanded by a developer in many different ways. For instance, a new cache may be implemented for processor(s), fixes or work-arounds for bugs in the processor(s) may be implemented, and/or various other types of expansions to the processor(s) original functionality may be implemented. Thus, for example, an Original Equipment Manufacturer (OEM) may use a processor (e.g., an IA-64 processor) in a system that the OEM is developing, and the OEM may desire to add further functionality to the existing IA-64 processor. In many instances, the developer (e.g., OEM) is unable (or unwilling) to modify the existing supporting firmware for the processor that the OEM is using. For example, in the IA-64 architecture, the OEM may not have access to the code of the PAL firmware and/or the OEM may not have legal rights to modify such PAL firmware (e.g., the processor developer may not grant the OEM the right to modify their PAL firmware). Thus, the OEM may desire to expand the processor's functionality in some way, such as by adding a new cache to the processor, but the OEM may be unable/unwilling to modify the PAL firmware such that it will support the expanded functionality.

Expanding the functionality of logic, such as a processor, may entail adding new procedure calls to the logic. For instance, upon adding a new cache to an IA-64 processor, additional procedure calls for accessing the new cache (e.g., clearing the cache, querying the cache, etc.) may be desired. However, again the OEM may be unable/unwilling to modify the PAL firmware such that it will support the new procedure calls. That is, the PAL interface may provide access to a standard (e.g., published) set of procedure calls, and the OEM may be unable/unwilling to modify the PAL interface such that it recognizes the newly added procedure calls.

As described further below, certain embodiments of the present invention enable a processor's (or other logic's) functionality to be expanded without requiring modification to pre-existing supporting firmware (e.g., interface) of the processor. For example, pre-existing supporting firmware may be implemented for supporting a particular function of a processor, and embodiments of the present invention enable the particular function to be expanded without requiring modification to the pre-existing supporting firmware. That is, a given functionality that is architecturally accommodated by pre-existing supporting firmware may be expanded without modifying the pre-existing supporting firmware for supporting the expanded functionality. As an example, in the IA-64 architecture, pre-existing PAL firmware generally accompanies the processor and supports certain functions of the processor, such as access to the processor's cache (e.g., enables the OS to query the processor to determine the number, size, etc. of its cache(s)). An embodiment of the present invention enables an additional cache to be implemented for such an IA-64 processor without requiring modification to its pre-existing PAL firmware. More specifically, an embodiment of the present invention enables additional procedure calls to be added for supporting the added cache (which are not supported by the pre-existing PAL interface) without requiring modification of the PAL interface. Further, the technique used for invoking such procedure calls may obscure them, wherein the technique used for supporting the added functionality (e.g., the cache) is not readily identifiable to one analyzing the system.

In one embodiment implementing new procedure calls within the IA-64 architecture (such as that of FIG. 3 described further below) that are not supported by its PAL interface, an "interposer" is provided that intercepts procedure calls (e.g., from the OS) directed to the PAL firmware, and if the calls are related to an expanded functionality not supported by the pre-existing PAL firmware, the interposer supports the expanded functionality (e.g., returns information relating to the expanded functionality). In other words, the interposer "poses" as the PAL firmware for supporting an expanded functionality of which the pre-existing PAL firmware is unaware. If an intercepted call is related to a functionality that is supported by the pre-existing PAL firmware, the interposer passes such call through to the pre-existing PAL firmware. Thus, the processor's functionality may be expanded and such expanded functionality may be supported by an interposer such that the pre-existing supporting firmware (e.g., PAL) is not required to be modified. Accordingly, an embodiment of the present invention enables an extended function to be implemented that is transparent to the OS and to the PAL. That is, an embodiment of the present invention enables an extended function to be implemented with support for the extended function provided by an interposer, and the interfaces for the interposer are transparent to the OS and PAL (e.g., it appears to that OS and PAL that they are communicating directly with each other). In addition, there are interactions between PAL and SAL which are also architected (noted as TRANSFERS to SAL entrypoints in FIG. 3) which the interposer intercepts without either SAL or PAL noticing this fact.

FIG. 1 shows an example block diagram of a traditional system 100 in which an interface 103 is implemented. Interface 103 provides access to procedure calls 104 that are defined for logic 105. For instance, in the well-known IA-64 architecture, PAL provides such an interface 103 that provides access to standard, defined procedure calls 104 for an IA-64 processor (e.g., logic 105). Typically, procedure calls 104 are accessed by sending to an appropriate vector associated with interface 103 an index identifying the desired procedure call to be invoked. More specifically, the index allows the vector (or dispatch routine address) to pass the call 102 to the desired procedure call 104. With certain interfaces, such as PAL in the IA-64 architecture, the index is included as a parameter that is passed in call 102. For example, in the well-known IA-64 architecture, the PAL call PAL_VERSION is called by passing the index of "0x14" into the architected PAL firmware vector. For instance, a caller 101 passes the appropriate index to the interface's vector via call 102 to invoke the desired procedure call 104. The vectors and indexes for invoking procedure calls 104 via interface 103 may be published. For instance, interface 103 may publish the standard vectors and indexes for invoking procedure calls 104 to memory 106, which is accessible by caller 101. In other implementations, the indices may not be published to memory 106, but may instead be published in written documentation, for example.

Figure 2:
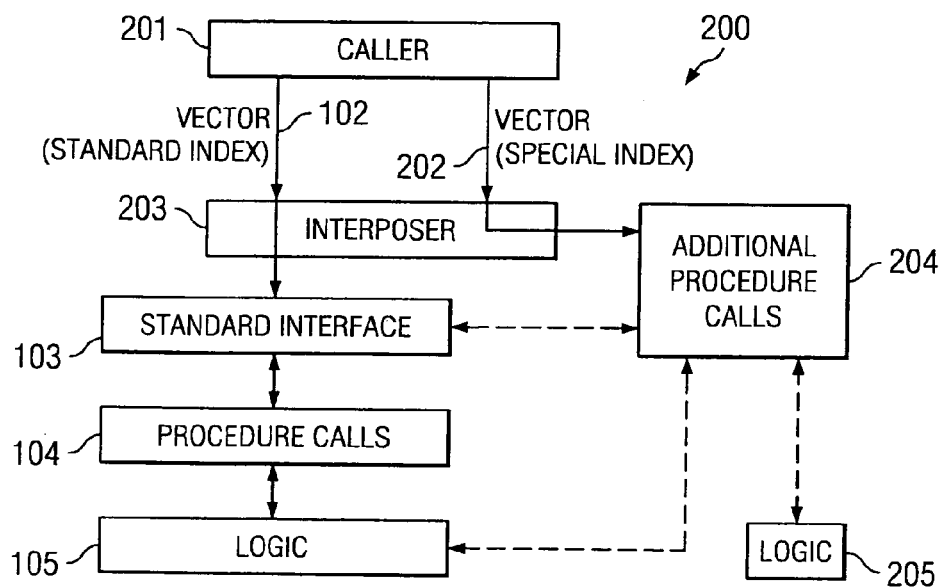
FIG. 2 shows an example block diagram of a system implementing an embodiment of the present invention, wherein an interposer intercepts calls to a standard interface to provide support not only for the standard, published procedure calls of the standard interface but also supports additional procedure calls not supported by the standard interface.

As mentioned above, it is often desirable to add further procedure calls, in addition to the standard, defined procedure calls of an interface, without modifying the interface. An example block diagram of a system 200 implementing an embodiment of the present invention is shown in FIG. 2. As shown, system 200 includes standard interface 103 that provides access to standard procedure calls 104 for logic 105, as described above in FIG. 1. Further, in the example of FIG. 2, additional procedure calls 204 (e.g., procedure calls in addition to the standard procedure calls 104 published for standard interface 103) are implemented. Such procedure calls 204 may invoke operations on logic 105 and/or new logic 205, as described further below. In accordance with embodiments of the present invention, an interposer 203 is implemented that intercepts procedure calls from caller 201 (e.g., an OS) directed to standard interface 103, and determines whether the call from caller 201 is to invoke a standard procedure call 104 or an added procedure call 204. Thus, interposer 203 "poses" as standard interface 103, while also supporting the added procedure calls 204.

In accordance with one embodiment of the present invention, interposer 203 determines from the intercepted index whether the requested procedure call is a standard procedure call 104 (and thus should be passed through to standard interface 103) or whether the requested procedure call is a newly added procedure call 204 that is not supported by interface 103. For instance, if caller 201 makes call 102 that passes a standard index to the vector of interface 103, interposer 203 intercepts such call 102 and determines that it is requesting a standard procedure call 104 that is supported by interface 103, and thus interposer 203 passes such call 102 through to standard interface 103, as shown in FIG. 2. If, on the other hand, caller 201 makes call 202 that passes a "special" index directed to the vector of interface 103, interposer 203 intercepts such call 202 and determines that it is requesting a new procedure call 204 that is not supported by interface 103, and thus interposer 203 directs the call 202 to a non-standard interface (not shown) to invoke the requested procedure call 204.

Thus, in an embodiment of the present invention, a "special" index is used to identify added procedure calls 204 that are not supported by interface 103. In certain implementations, the "special" index is a pseudo-random value from which interposer 203 can determine the appropriate new procedure call 204 to be invoked thereby. The special index value is referred to as pseudo-random in this example embodiment because it is a number that is known to the developer of the additional procedure calls (and is thus not a random number but is instead a number that does not correspond to any standard indices of interface 103) but appears to be a random index number to the interface 103 (e.g., if it were passed to interface 103, the interface would not recognize it as corresponding to a procedure call 104 that it supports). In accordance with one embodiment, at development time the pseudo-random number is generated with some type of random number generator. The initial random number becomes the base of the non-standard ("special") indices, and so it must not fall in the range of any of the standard indices. The obscurity is increased by selecting a random number that is much larger in size than any architected/standard index. For example, if the standard indices are only 32-bits in size, the random number should have bits set in the full 64-bit value, preferably in the most-significant portion of the 64 bits. It is important that interface 103 view the non-standard indices as unimplemented, since interposer 203 may be uninstalled in certain situations. Thus, any index range that is used for the non-standard calls is to be verified with interface 103 as being unimplemented.

Thus, in certain implementations, a pseudo-random number is chosen as a "base" number, and then each unique, newly added procedure call 204 is assigned some offset from that unique base number. As an example, a call, HIDDEN_CALL_1, may be called by passing the index of 0x3210_0123_3210_0123, which is at a defined "base" with an offset of 0 added thereto. The next call, HIDDEN_CALL_2, may be called by passing the index of 0x3210_0123_3210_0124, which is at the defined random base with an offset of 1 added thereto.

As described further below, utilizing such a "special" index for calling newly added procedures enables the newly added procedure calls to be obscured. That is, they are not readily recognizable from analysis of the standard interface 103. It may be desirable/beneficial to obscure the newly added procedure calls for several reasons. First, obscuring the existence of the non-standard calls makes it virtually impossible to conflict with the architected indices, even if the architected indices are increased in number (e.g., by the developer of interface 103). Further, obscuring the existence of the non-standard calls helps ensure that the custom interface (for non-standard calls) is "protected" from accidental use, i.e., a priori knowledge is required. It will be virtually impossible to discover the newly added calls 204 without a hardware debugger or firmware reverse-engineering.

Figure 3:
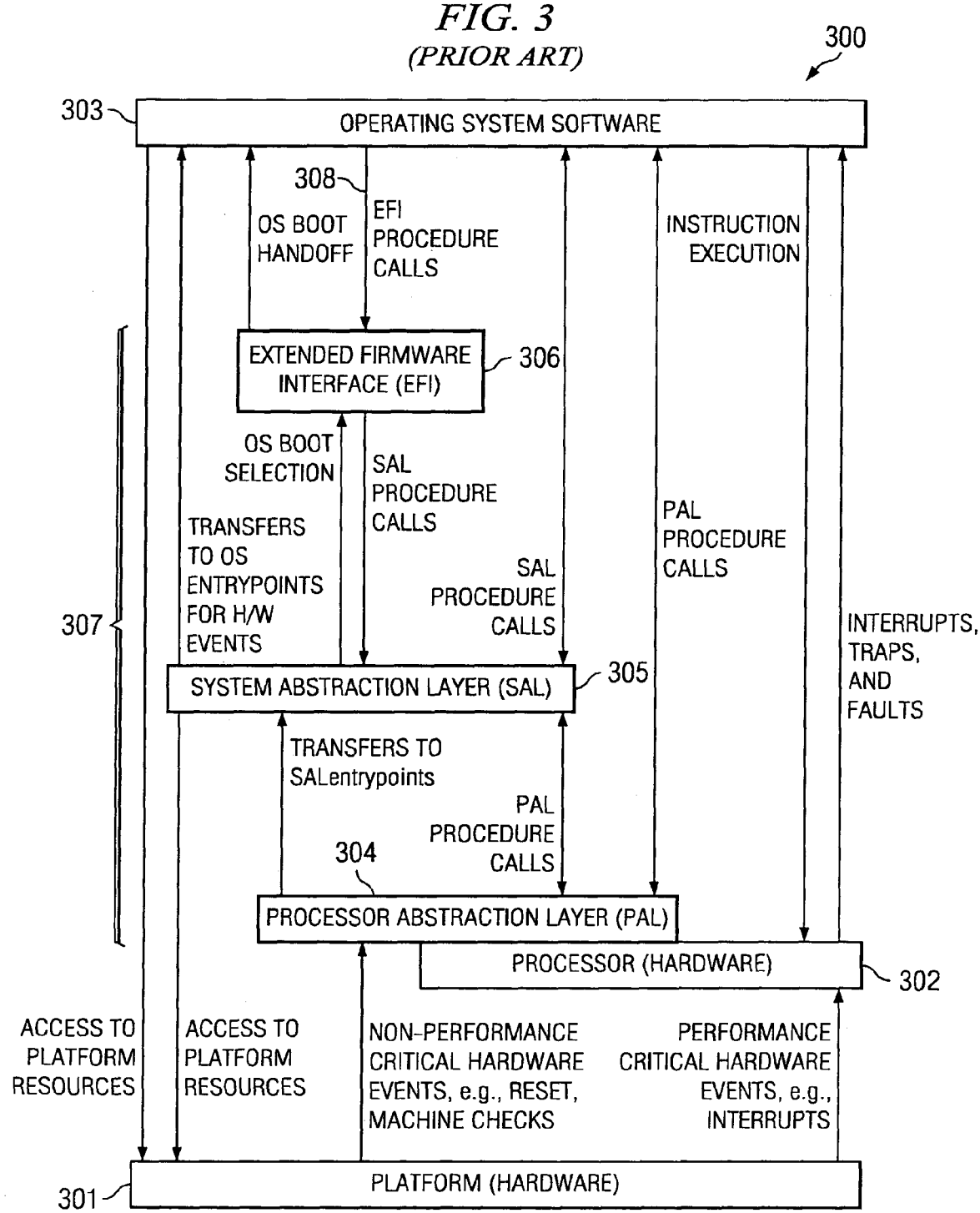
FIG. 3 shows an example block diagram of a traditional IA-64 architecture system in which embodiments of the present invention may be implemented.

FIG. 3 shows an example context in which certain embodiments of the present invention may be implemented. More particularly, FIG. 3 shows a block diagram of a traditional IA-64 architecture system. While embodiments of the present invention are applicable to other environments (e.g., within other processor architectures) to enable procedure calls for logic (e.g., for a processor) to be expanded without requiring modification to the logic's standard interface, certain embodiments are particularly applicable to the IA-64 architecture and thus many examples used herein are directed to the IA-64 architecture. Accordingly, the traditional IA-64 architecture is described briefly in conjunction with FIG. 3. The quintessential model of the IA-64 architecture is given in the *Intel IA-64 Architecture Software Developer's Manual, Volume 2: IA-64 System Architecture*, in section 11.1 *Firmware Model*, the disclosure of which is hereby incorporated herein by reference.

FIG. 3 shows an abstract model of an example system 300, which comprises hardware platform 301, processor(s) 302, OS 303, and system firmware 307. In this example implementation, supporting system firmware 307 comprises PAL 304, SAL 305, and EFI 306. PAL 304, SAL 305, and EFI 306 together provide, among other things, the processor and system initialization for an OS boot. Hardware platform 301 represents the collection of all of the hardware components of system 300, other than the system's processors 302.

The arrows shown in the abstract model of FIG. 3 between these various components indicate the types of permitted interactions for the behavior of system 300. When system 300 is first powered on, there are some sanity checks (e.g., power on self-test) that are performed by microprocessors included in platform 301, which are not the main system processors 302 that run applications. After those checks have passed, power and clocks are given to processor 302. Processor 302 begins executing code out of the system's Read-Only Memory (ROM) (not specifically shown in FIG. 3). The code that executes is the PAL 304, which gets control of system 300. PAL 304 executes to acquire all of the processors 302 such that the processors begin executing concurrently through the same firmware.

After it has performed its duty of initializing the processor(s) 302, PAL 304 passes control of system 300 to SAL 305. It is the responsibility of SAL 305 to discover what hardware is present on platform 301, and initialize it to make it available for the OS 303, primarily main memory. When main memory is initialized and functional, the firmware 307 (i.e., PAL 304, SAL 305, and EFI 306, which is not running yet) is copied into the main memory. Then, control is passed to EFI 306, which is responsible for activating boot devices, which typically includes the disk. EFI 306 reads the disk to load a program into memory, typically referred to as an operating system loader. EFI 306 loads the OS loader into memory, and then passes it control of system 300 by branching one of the processors 302 (typically called the boot startup processor) into the entry point of such OS loader program.

The OS loader program then uses the standard firmware interfaces 307 to discover and initialize system 300 further for control. One of the things that the OS loader typically has to do in a multi-processor system is to retrieve control of the other processors. For instance, at this point in a multi-processor system, the other processors may be executing in do-nothing loops. In an Advanced Configuration and Power Interface (ACPI)-compatible system, OS 303 makes ACPI calls to parse the ACPI tables to discover the other processors of a multi-processor system 300 in a manner as is well-known in the art. Then OS 303 uses the firmware interfaces 307 to cause those discovered processors to branch into the operating system code. At that point, OS 303 controls all of the processors and the firmware 307 is no longer in control of system 300.

As OS 303 is initializing, it has to discover from the firmware 307 what hardware is present at boot time. And in the ACPI standards, it also discovers what hardware is present or added or removed at run-time. Further, the supporting firmware (PAL, SAL, and EFI) are also used during system runtime to support the processor. For example, OS 303 may access a particular function of the processor 302 via the supporting firmware 307, such as querying the firmware (PAL) for the number, size, etc., of the processor's cache. Some other well-known firmware functions that OS 303 may employ during runtime include: (a) PAL 304 may be invoked to configure or change processor features such as disabling transaction queuing (PAL_BUS_SET_FEATURES); (b) PAL 304 may be invoked to flush processor caches (PAL_CACHE_FLUSH), which is one of the functions that the example "HONDO" embodiment of the present invention (described below) interposes on; (c) SAL 305 may be invoked to retrieve error logs following a system error (SAL_GET_STATE_INFO, SAL_CLEAR_STATE_INFO); (d) SAL 305 may be invoked as part of hot-plug sequences in which new I/O cards are installed into the hardware (SAL_PCI_CONFIG_READ, SAL_PCI_CONFIG_WRIT); (e) EFI 306 may be invoked to change the boot device path for the next time the system reboots (SetVariable); (f) EFI 306 may be invoked to change the clock/calendar hardware settings; and (g) EFI 306 may be invoked to shutdown the system (ResetSystem).

The interfaces illustrated in the firmware model of FIG. 3 (EFI procedure calls, SAL Procedure Calls, PAL Procedure Calls, Transfers to SAL entrypoints, OS Boot Handoff, OS entrypoints for hardware events) are all architecturally defined. Any IA-64 hardware system that complies with this model should work with any OS that also complies with this model. The architecture definition is interface-based, however, and the internal implementation of the firmware (SAL and EFI) is not specified by the architecture. Only the interfaces between the firmware and the OS and the PAL and the SAL are specified by this architecture. Therefore, vendors are free to innovate within their firmware implementation provided they adhere to both the architectural (and legal) requirements of employing INTEL-developed PAL with INTEL-developed Processors (e.g., ITANIUM, MADISON, etc.).

During the boot-up process of the above-described architecture, the platform SAL 305 (generally written by the OEM who resells the IA-64 processors and PAL 304 in a system) copies PAL 304 into main memory. SAL 305 writes an address to architected EFI tables identifying the entry point to the PAL procedure. OS 303, in turn, retrieves the address for the PAL procedures and employs it whenever calling the PAL procedures. The choice of where PAL 304 is placed (and thus where its entrypoint resides) is entirely up to the platform firmware (SAL 305). As described further below, certain embodiments of the present invention interpose the PAL procedure calls in a new Non-PAL firmware module (referred to as an interposer) that enables the functionality of the processor to be extended without requiring changes to the pre-existing PAL 304 or to the OS 303. More particularly, in one embodiment, the address provided to OS 303 by SAL 305 identifying the entrypoint to the PAL 304 actually identifies an entrypoint to the interposer module. Thus, all calls made to PAL 304 are actually directed to the interposer module.

Accordingly, the interposer module is capable of intercepting the calls to PAL 304 and supporting an extended functionality of the processor architecture. For instance, as described further below, a particular function that is supported by the pre-existing PAL 304 (e.g., access to cache) may be expanded (e.g., by addition of another cache) within the architecture of system 300, and the interposer module (not shown in FIG. 3) may be used to support the expansion of the particular function (e.g., to support access to the added cache) without requiring any modification to the pre-existing PAL 304. Preferably, the interposer module makes it appear to the OS 303 as though the pre-existing PAL 304 was supporting the expanded processor functionality, so no OS changes are required. In effect, the interposer module of one embodiment appears as PAL to the OS, but it appears as SAL to the PAL.

As mentioned above, it may be desirable to extend the functionality of the processor in various different ways. More particularly, a given function of the processor may be supported by pre-existing supporting firmware (e.g., PAL firmware) for the processor, and the given function may be expanded in some way (e.g., by an OEM) without requiring modification to the supporting firmware for supporting the expansion of the given function. One example of extending the functionality of a processor is described hereafter in conjunction with FIGS. 4A, 4B, and 5-7 in which a cache is added.

In one embodiment of the present invention, interposer firmware described further below is implemented to support an extended cache functionality provided by an added "Sherpa" cache controller. Accordingly, for this embodiment, it is appropriate to further consider the "Sherpa" cache implementation. The Sherpa External Reference Specification Rev 0.4, the disclosure of which is hereby incorporated herein in its entirety and hereinafter referred to as the "Sherpa ERS", provides in part:

2.1 Introduction

Sherpa is a cache-controller and bus-bridge chip for iA-64, processors that reside on the MCKINLEY bus (slot K). It is intended to be used with iA-64 CPU's to provide the performance and scaling requirements for high-end iA-64 systems in the 2002-2003 timeframe. While Sherpa's schedule and performance benefits best align with the MADISON processor, it is compatible with any MCKINLEY bus based iA-64 CPU (MCKINLEY or MADISON). Sherpa is targeted for high-end server and workstation applications, both commercial and technical. Sherpa will enable iA-64 to better compete with IBM's Power4 systems by providing two iA-64 processor cores and 32 MB of cache housed in a module that operates in the same space, power, and thermal constraints as a single MCKINLEY module.

2.1.1 Sherpa Overview

Sherpa is sometimes called an "in-line" cache because it logically resides between a processor(s) and the memory agent. See FIGS. 2-1 [FIG. 2B herein]. From the processor's perspective Sherpa acts as the memory agent (the central agent on the upper MCKINLEY bus), whereas from the actual memory agent's perspective Sherpa acts as if it were a processor (a symmetric agent on the lower MCKINLEY bus). Sherpa has two major value propositions: it provides a large, off-chip (32 MB) cache for iA-64 processors, and it allows for adding more iA-64 processors to a system without presenting additional bus loads to the local memory agent.

Figure 4A:
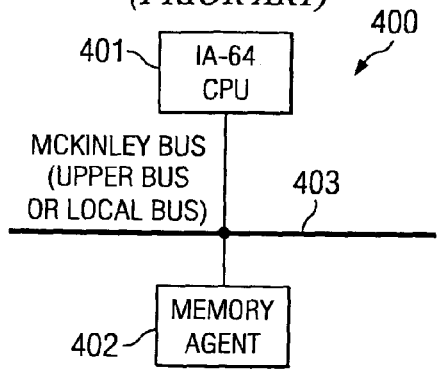
FIG. 4A shows a traditional IA-64 MCKINLEY bus-based design.
Figure 4B:
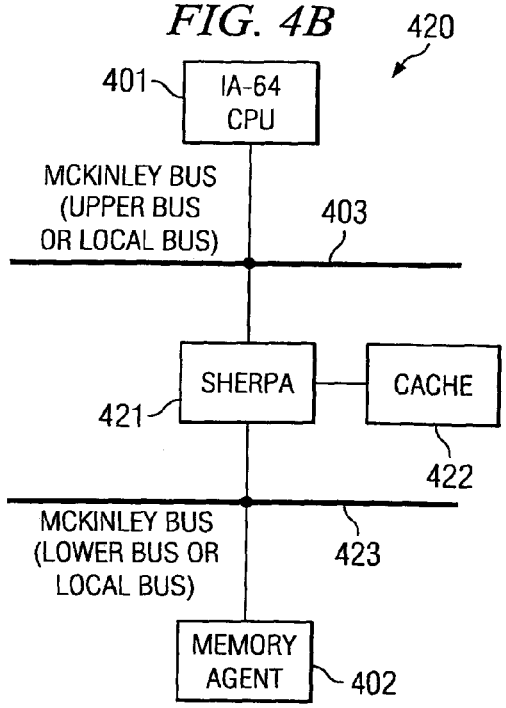
FIG. 4B shows an IA-64 MCKINLEY bus-based design employing a Sherpa cache that resides between the IA-64 processor and its connection to the main memory system.

As can be seen in FIGS. 4A-4B, which compare a nominal IA-64 MCKINLEY bus-based design (FIG. 4A) to one employing Sherpa (FIG. 4B), the Sherpa basically resides between the IA-64 processor and its connection to the main memory system. That is, the nominal IA-64 MCKINLEY bus-based system 400 of FIG. 4A comprises an IA-64 processor 401 and a memory agent 402 accessible via the upper (or local) MCKINLEY bus 403. Sherpa system 420 of FIG. 4B also comprises IA-64 processor 401 and memory agent 402. However, Sherpa controller 421 logically resides between processor 401 and memory agent 402. As described in the Sherpa ERS, from the perspective of processor 401, Sherpa controller 421 acts as the memory agent (the central agent on the upper MCKINLEY bus 403), whereas from the perspective of the actual memory agent 402, Sherpa controller 421 acts as if it were a processor (a symmetric agent on the lower MCKINLEY bus 423). As also described in the Sherpa ERS, Sherpa has two major value propositions: 1) it provides a large, off-chip (32 MB) cache 422 for IA-64 processor 401, and 2) and it allows for adding more IA-64 processors to a system without presenting additional bus loads to the local memory agent 402.

Accordingly, in the example of FIG. 4B, memory agent 402 "thinks" it is connected to an IA-64 CPU 401, and the IA-64 CPU 401 "thinks" it is connected to a Memory Agent 402. However, there is a complex cache controller 421 logically interposed between them. Because of this design, the Sherpa device allows construction of a processor module that contains two IA-64 processors where the nominal (non-interposed) design of system 400 of FIG. 4A permits only one.

Figure 5:
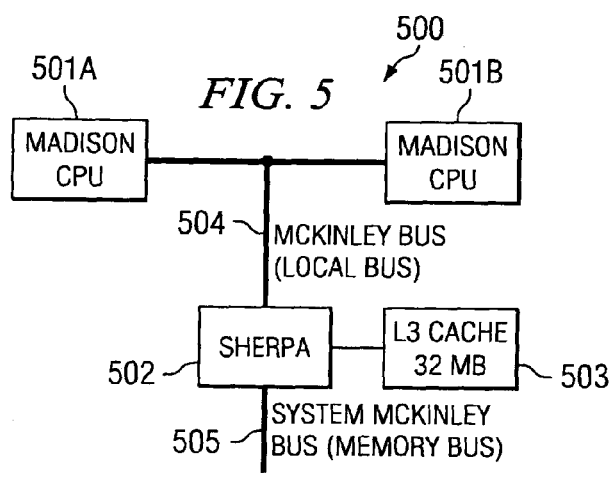
FIG. 5 shows an example block diagram of a HONDO module that contains two IA-64 processors, and a shared Sherpa Cache in a common physical package for which certain embodiments of the present invention may be implemented.

For instance, a module code-named "HONDO" may be implemented, which contains two MADISON processors, the Sherpa Cache controller 421 and cache RAM 422 in the same physical package as a standard MCKINLEY package. An example block diagram of such a HONDO module that contains two IA-64 processors is shown in FIG. 5. As shown, example processor module 500 (or "HONDO" module) comprises two MADISON processors 501A and 501B. Module 500 further comprises Sherpa Cache controller 502 (which corresponds to Sherpa Controller 421 of FIG. 4B) communicatively coupled to processors 501A and 501B via the local MCKINLEY Bus 504. As further shown, an L3 cache 503 (which corresponds to cache 422 of FIG. 4B) is also provided. Sherpa controller 502 is also communicatively coupled to the system MCKINLEY bus (memory bus) 505. Thus, the L3 cache 503 is shared by the two processors 501A and 501B. Further, the HONDO module 500 may be connected to a socket on the MCKINLEY system bus 505. Thus, two processors 501A and 501B may be implemented at each socket, as opposed to only one processor at each socket.

Figure 6:
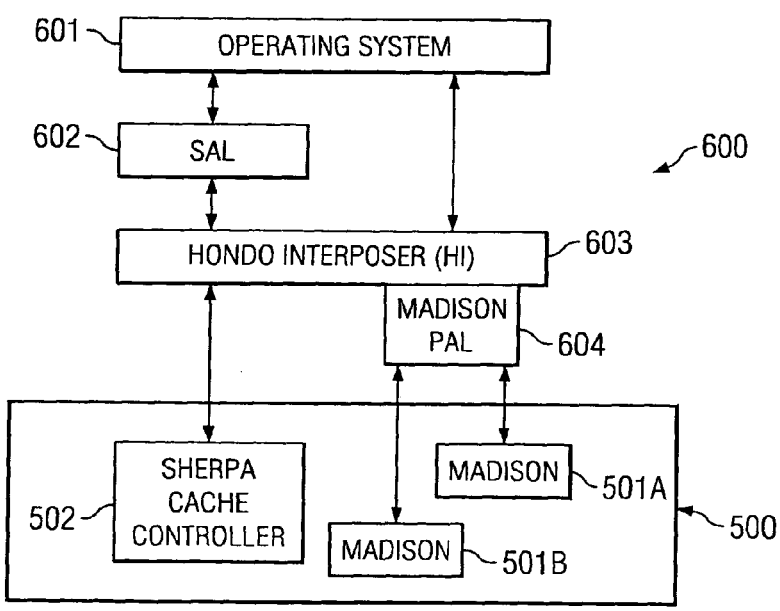
FIG. 6 shows a block diagram of an example implementation of a HONDO Module of FIG. 5 within a system using interposer firmware of an embodiment of the present invention to enable the extended Sherpa Cache functionality without requiring any modification to the pre-existing supporting MADISON PAL firmware.

FIG. 6 shows a block diagram of an example implementation of a HONDO Module 500 within a system 600 using interposer firmware 603 (referred to as a "HONDO Interposer" in this example) to enable the extended Sherpa Cache functionality without requiring any modification to the pre-existing supporting MADISON PAL firmware 604. System 600 comprises OS 601 (which corresponds to OS 303 of FIG. 3), SAL 602 (which corresponds to SAL 305 of FIG. 3), and HONDO module 500 (of FIG. 5). As described above with FIG. 5, HONDO module 500 comprises two MADISON processors 501A and 501B, and a Sherpa Cache Controller 502. The traditional MADISON PAL 604 supporting firmware is implemented in system 600 for supporting certain functions of MADISON processors 501A and 501B. For example, MADISON processors 501A and 501B may each comprise L1 and L2 caches that MADISON PAL 604 supports. Thus, certain standard procedure calls for the L1 and L2 caches are supported by the MADISON PAL interface 604. However, MADISON PAL interface 604 does not support new procedure calls for the newly added L3 cache.

Because HONDO Module 500 extends the cache functionality of processors 501A and 501B in a manner that is not supported by the existing MADISON PAL 604 (i.e., adds a shared L3 cache 503), HONDO interposer 603 is also included in system 600 for supporting this extended cache functionality. For instance, as described above, SAL 602 may be implemented to provide OS 601 with an entry point address for PAL procedure calls, which identifies an entry point address to HONDO interposer 603, rather than for MADISON PAL 604 such that calls made by OS 601 to MADISON PAL 604 are actually directed to HONDO interposer 603. As indicated by the communication arrows in FIG. 6, if a PAL procedure call made by OS 601 is for a procedure (or functionality) supported by MADISON PAL 604 (i.e., is a standard procedure call for PAL 604), HONDO interposer 603 passes such procedure call through to MADISON PAL 604 and it supports such procedure call in a typical manner. However, if the procedure call made by OS 601 is for a procedure (or functionality) that involves an extended function not supported by MADISON PAL 604 (i.e., is a new procedure call), then HONDO interposer 603 supports such extended function. For instance, HONDO interposer 603 is communicatively coupled to Sherpa Cache controller 502 to support the added cache functionality provided by HONDO module 500, which is not supported by MADISON PAL 604.

In this embodiment, the Sherpa cache is transparent to the OS. That is, OS 601 does not see or need to explicitly manage the Sherpa cache 502 for correct system operation. This requirement arises in this example embodiment because the existing PAL architecture and implementation for MADISON has no ability to manage a cache that is shared by two different processor cores. Caches are expected to be separate and individually managed by PAL calls directly. Thus, the PAL_CACHE_FLUSH function is an example function that HONDO interposer 603 performs for a flush of the Sherpa cache without either OS 601 or PAL 604 needing to know this (i.e., operation is performed transparently). Responsive to a flush cache function invoked by OS 601, HONDO interposer 603 invokes the PAL_CACHE_FLUSH and then also performs operations to flush all of the Sherpa cache before returning to OS 601.

Figure 7:
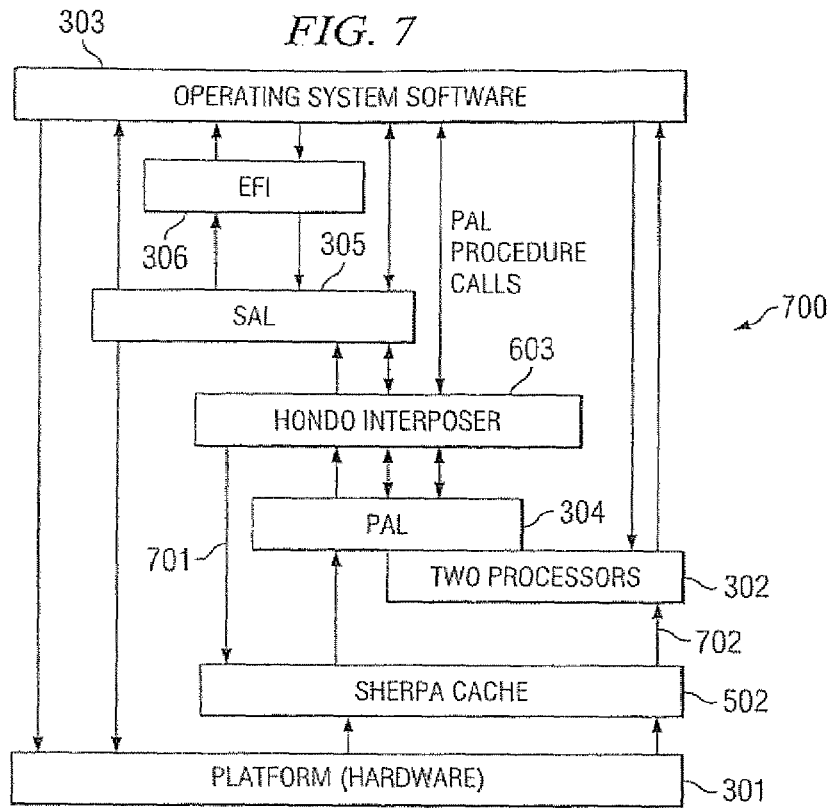
FIG. 7 shows an example system that illustrates the IA-64 architecture of FIG. 3 as modified in accordance with an embodiment of the present invention to implement a HONDO interposer to support the Sherpa cache of a HONDO module implemented in a system.

FIG. 7 shows an example system 700 that illustrates the IA-64 architecture of FIG. 3 as modified in accordance with an embodiment of the present invention to implement the HONDO interposer 603 to support the Sherpa cache 502. It should be recognized that as with the IA-64 architecture of FIG. 3, system 700 comprises OS 303 and hardware platform 301. System 700 also comprises processor 302 (which actually comprises 2 MADISON processors in this example implementation) and supporting firmware for such processors, such as PAL 304, SAL 305, and EFI 306. The interaction between the various components are again illustrated as arrows. It should be recognized that the interactions are the same as in the traditional IA-64 architecture of FIG. 3, except for the interactions on which HONDO interposer 603 interposes. In system 700, HONDO interposer 603 is implemented to intercept communication directed to (or intended for) PAL 304, such as the PAL procedure calls (e.g., PAL_CACHE_FLUSH call, etc.) made by OS 303.

As shown, communication 701 illustrates HONDO interposer 603 accessing Sherpa cache 502. For example, communication 701 may perform a flush of the Sherpa cache 502 responsive to an OS procedure call of PAL_CACHE_FLUSH intercepted by HONDO interposer 603. In the example implementation of FIG. 7, the accesses to Sherpa cache 502 are register accesses. Thus, communication 701 represents HONDO interposer 603 accessing Sherpa registers such as error log registers, control registers (e.g., to flush the cache), and diagnostic registers (e.g., for tests in which the cache is not transparent but is actually being tested by software that is aware of its presence). The other communication arrows of FIG. 7 represent the corresponding communications shown in FIG. 3. For instance, communication 702 is the same function as the function labeled "Performance Critical Hardware Events, e.g., Interrupts" in FIG. 3, which is a passthrough the processors 302 to OS 303 as signals into the OS. In this example implementation, PAL 304 is unaware of the existence of Sherpa cache 502, but PAL 304 is aware of the bus on which Sherpa cache 502 resides.

As mentioned above, various other types of extensions to the functionality of a processor may be implemented instead of or in addition to the extended cache described above. Thus, while added procedure calls relating to an additional cache that are not supported by the standard PAL interface are described in the above example, various other types of added procedure calls that are not supported by a standard interface (e.g., PAL) for logic (e.g., processor) may be added in accordance with embodiments of the present invention.

Turning to FIG. 8, an example operational flow diagram of one embodiment of the present invention is shown. The example operational flow of FIG. 8 is for one embodiment of a system that comprises a HONDO module 500 and HONDO interposer 603, such as the systems described above in FIGS. 6 and 7. Of course, as will be recognized by those of ordinary skill in the art, the example operational flow of FIG. 8 may be readily adapted for application to other types of extended logic (e.g., processor) functions. In operational block 801, the HONDO interposer firmware 603 determines whether the HONDO module 500 is present in the system. Such determination may be made during the boot-up process of the system. For instance, as described above, certain systems may comprise a single processor (e.g., MADISON processor) coupled to each socket of the McKinley bus. However, other implementations may comprise a HONDO module 500 that includes two processors (501A and 501B) and a shared L3 cache for such processors (a SHERPA cache). If the HONDO module is not discovered as being implemented in the system, then the boot-up process continues in a traditional fashion and the system operates in a traditional manner using pre-existing supporting firmware (e.g., MADISON PAL 604 for a MADISON processor) in block 802.

On the other hand, if a HONDO module is discovered as implemented in the system in block 801, operation advances to block 803. In block 803, SAL 305 (labeled as SAL 602 in FIG. 6) writes an address to EFI tables identifying the HONDO interposer 603 as the PAL to the OS 303 (labeled OS 601 in FIG. 6). Thus, as described above, an entrypoint address for PAL procedure calls actually identifies HONDO interposer 603, rather than the pre-existing PAL firmware. Thus, a requester (e.g., the OS) making a PAL procedure call "thinks" it is making the call to the pre-existing PAL, but the procedure call is actually directed to the HONDO interposer 603.

In block 804, it is determined whether a PAL procedure call is made by a requester (e.g., by the OS). More particularly, the HONDO interposer 603 determines whether it has received a PAL procedure call. If a procedure call is not received, then operation advances to block 811 described further below.

Once a PAL procedure call is received by the HONDO interposer 603, operation advances from block 804 to block 805 whereat the HONDO interposer 603 determines whether called PAL procedure is fully supported by the pre-existing PAL. There are many PAL procedure calls that are fully supported by the pre-existing PAL when the HONDO module 500 is included in the system. One is the well-known PAL_PERF_MON_INFO function. This function Returns Performance Monitor information about what can be counted and how to configure the monitors to count the desired events. This feature is used to tune system software and applications for maximal performance. It is completely processor-specific and there is no need for the interposer to "interfere" with this function. It is one of the many "pass-thru" operations in which the HONDO interposer 603 is simply a do-nothing "gasket" (or adapter) between the OS and the PAL.

If it is determined at block 805 that the called PAL procedure is fully supported by the pre-existing PAL, operation advances to block 806 whereat the HONDO interposer 603 passes the PAL procedure call to the pre-existing PAL (e.g., to MADISON PAL 604 of FIG. 6). In operational block 807, the HONDO interposer 603 receives a response to the procedure call from the pre-existing PAL and passes the response to the requester (e.g., OS). Operation then advances to block 811 described further below.

If, on the other hand, it is determined at block 805 that the called PAL procedure is not fully supported by the pre-existing PAL, operation advances to block 808. At block 808, if any support is provided for the procedure call by the pre-existing PAL, the HONDO interposer 603 passes the procedure call to the pre-existing PAL for such support. For example, if the procedure call queries the number of levels of cache, such procedure may be passed to the pre-existing PAL for partial support (e.g., the pre-existing PAL is aware of the two levels of cache, L1 and L2, implemented for a MADISON processor). In block 809, the HONDO interposer 603 directs the procedure call to the SHERPA Controller 502 for support for the extended functionality (e.g., L3 cache) that is not supported by the pre-existing PAL 604. In block 810, the HONDO interposer 603 receives a response from the SHERPA controller 502 and a response, if any, from the pre-existing PAL 604, and the HONDO interposer 603 communicates a response (e.g., that comprises information compiled from the responses of the pre-existing PAL and the SHERPA controller) to the requester (e.g., OS). Operation then advances to block 811.

At block 811, it is determined whether an error is detected. If an error is detected, the HONDO interposer 603 interposes on information compiled for the error log in block 812. Thus, HONDO interposer 603 may interpose on interactions performed during an error state to provide information regarding the extended functionality that it supports (e.g., the SHERPA cache). Thereafter, the system may be halted for certain errors, or once the error is logged operation may return to block 804 for certain errors (as shown in the example of FIG. 8). Otherwise, if no error is detected in block 812, operation returns to block 804.

An example of implementing an interposer, such as HONDO interposer 603, for enabling various different types of expanded functionality for a processor is further described in co-pending and commonly assigned U.S. patent application Ser. No. 10/414,701 titled "SYSTEM AND METHOD FOR EXPANDING PROCESSOR FUNCTIONALITY" filed Apr. 16, 2003, the disclosure of which is hereby incorporated herein by reference.

Figure 9:
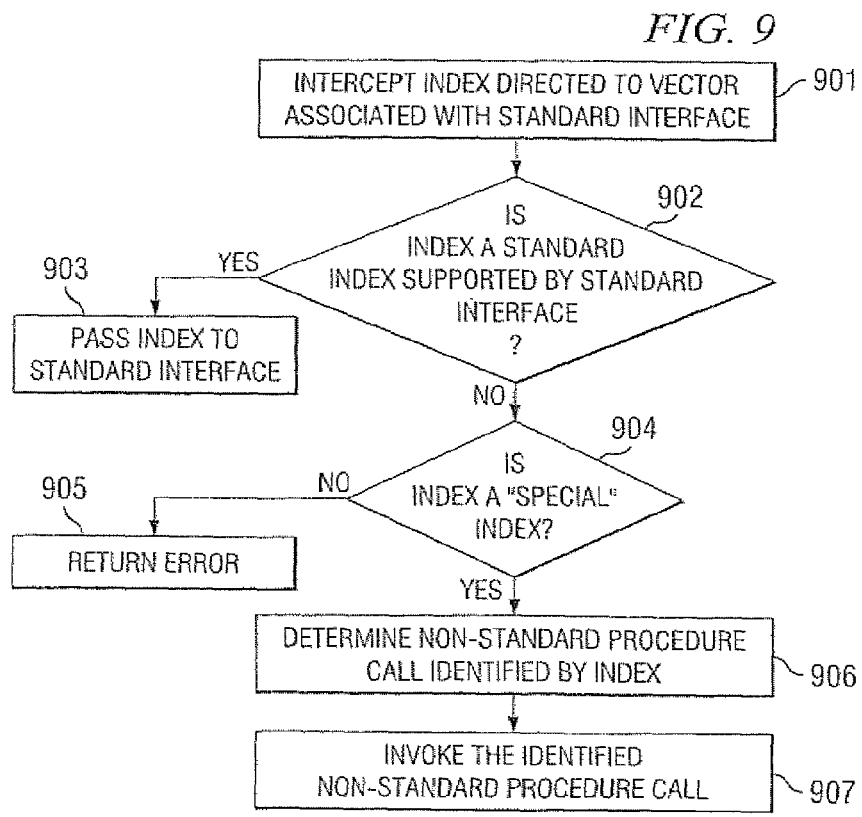
FIG. 9 shows an example operational flow diagram of an interposer, such as the interposer of FIG. 2, in accordance with one embodiment of the present invention.

Turning to FIG. 9, an example operational flow diagram of an interposer, such as interposer 203 of FIG. 2, in accordance with one embodiment of the present invention is shown. As shown, in operational block 901, interposer 203 (e.g., HONDO interposer 603 in the example of FIGS. 6 and 7), intercepts a call from a caller to a standard interface (e.g., PAL). More specifically, interposer 203 intercepts the index directed to a vector associated with such standard interface. In operational block 902, interposer 203 determines whether the intercepted index is a standard index. That is, it determines whether the intercepted index is an index for a procedure call that is supported by the standard interface. For example, the PAL call PAL_VERSION is called by passing the index of "0x14" into the architected PAL firmware vector, and thus upon intercepting such index "0x14", interposer 203 determines that it is an index associated with a call (i.e., PAL_VERSION in this example) that is supported by the PAL interface. If such index is an index for a procedure call that is supported by the standard interface, operation advances to block 903 whereat interposer 203 passes the call (the index) to the standard interface. Thus, operation proceeds as if the standard call was made directly to the standard interface without being intercepted by interposer 203.

If interposer 203 determines in block 902 that the intercepted index is not a standard index, then operation advances to block 904 whereat interposer 203 determines whether the index is a "special" index. As described above, such a "special" index may be an index having a pre-defined pseudo-random base number with a corresponding offset. If interposer 203 determines in block 904 that the received index is not a "special" index (and thus is neither a standard index nor a special index), an error is returned in block 905. That is, an error is returned just as if an unrecognized index were sent to the standard interface. If, on the other hand, interposer 203 determines in block 904 that the received index is a special index, operation advances to block 906 whereat interposer 203 determines the corresponding non-standard procedure call identified by such special index, and in block 907 interposer 203 invokes the identified non-standard procedure call corresponding to the received special index.

Figure 10:
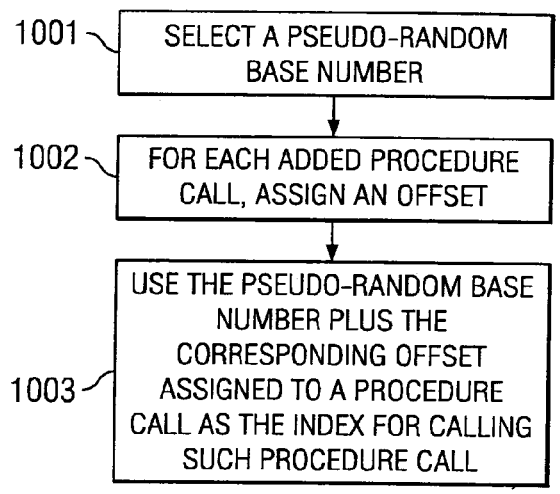
FIG. 10 shows an example flow diagram for enabling access to newly added procedure calls in a manner that obscures the procedure calls in accordance with one embodiment of the present invention.

As mentioned above, in certain situations it may be desirable to obscure the newly added procedure calls such that the technique for enabling access to those calls is not readily identifiable from an analysis of the system. FIG. 10 shows an example flow diagram for enabling access to newly added procedure calls in a manner that obscures the procedure calls in accordance with one embodiment of the present invention. As shown, in operational block 1001, a pseudo-random base number is selected. To improve its obscurity, the pseudo-random base number may be a relatively large number (as compared to the standard indices for an interface) and preferably does not fall sequentially immediately after the standard indices of the interface. As an example, IPF platforms are 64-bit, and thus the current size limit of an index for the PAL interface is 64 bits. The standard indices for such PAL interface are typically 32-bits in size, and thus a larger pseudo-random base number (e.g., a number having bits set in the full 64-bit value) may be used for the "special" indices. In order to make a brute force probe of the "special" indices more difficult (and thus improve their obscurity), the pseudo-random base should have bits set above bit 48, assuming the current standard indices are 32 bits in size. This creates a very large gap between architected and non-standard ("special") indices. The brute force method would have to increment the index for a very long time to eventually hit a non-standard function. Using a pseudo-random number as the base makes more elegant search methods, such as binary search, less likely to uncover the non-standard indices.

In operational block 1002, an offset is assigned to each newly added procedure call. The result of the base number offset by the offset of each newly added procedure call should not correspond to the index for a standard procedure call supported by the standard interface. That is, the "special" indices used for identifying the newly added procedure calls should be different than the standard interface's supported, published indices. In operational block 1003, the result of the "pseudo-random base number+the corresponding offset assigned to a procedure call" is used as the special index for calling such procedure call.

As an example, a pseudo-random base of 0x3210_0123_3210_012 may be selected in operational block 1001. A first newly added procedure call, HIDDEN_CALL_1, that is not supported by a standard interface may be assigned an offset of 0 in block 1002, and a second newly added procedure call, HIDDEN_CALL_2, that is also not supported by the standard interface may be assigned an offset of 1 in block 1002. The first procedure call, HIDDEN_CALL_1, may be called in operational block 1003 by passing the index of 0x3210_0123_3210_0123 to the vector of the standard interface. As described above, such index is intercepted by an interposer and recognized as a "special" index. The second procedure call, HIDDEN_CALL_2, may be called in operational block 1003 by passing the index of 0x3210_0123_3210_0124 to the vector of the standard interface. Again, such index is intercepted by an interposer and recognized as a "special" index.

It should be understood that while specific names have been used for referring to components in many of the examples described herein, such as the "HONDO" interposer, the "Sherpa" cache, and the "PAL" interface, embodiments of the present invention are not intended to be limited solely in application to those specific components. For instance, while the "HONDO" interposer is described as an example of one type of interposer that may be used with embodiments of the present invention, other types of interposers having different names are intended to be within the scope of the present invention. Similarly, while the "Sherpa" cache is described as an example type of cache structure that may be implemented in which additional procedure calls that are not supported by a standard interface (e.g., the PAL interface in an IA-64 processor) are desired, embodiments of the present invention are not intended to be limited solely in application to supporting new procedure calls for a "Sherpa" cache, but embodiments may similarly be utilized for supporting procedure calls for other types of cache structures. Further, embodiments of the present invention are not intended to be limited solely in application to supporting procedure calls for a cache structure, but may be used for supporting any other types of procedure calls that may be desired in a system which are not supported by a standard interface.

What is claimed is:

1. A system comprising:
    at least processor;
    a standard interface for at least one standard procedure;
    a non-standard interface for at least one non-standard procedure that is not natively supported by said standard interface;
    an interposer for intercepting procedure calls made to said standard interface and determining whether an intercepted procedure call is for invoking one of said at least one standard procedure or for invoking one of said at least one non-standard procedure, wherein if said intercepted procedure call is for invoking one of said at least one standard procedure said interposer directs said intercepted procedure call to said standard interface and wherein if said intercepted procedure call is for invoking one of said at least one non-standard procedure said interposer directs said intercepted procedure call to said non-standard interface;

an index, comprising less bits when identifying said one of said at least one standard procedure than when identifying said one of said at least one non-standard procedure, included in said intercepted procedure call to identify a procedure to be invoked; and wherein said interposer determines from said index whether said index identifies said one of said at least one standard procedure or said one of said at least one non-standard procedure.

2. The system of claim 1 wherein said standard interface is a Processor Abstraction Layer (PAL) interface.

3. The system of claim 1 wherein said at least one standard procedure is a standard procedure for an INTEL Architecture (IA)-64 processor.

4. The system of claim 1 wherein said interposer is assigned a vector used for accessing said standard interface for intercepting said procedure calls made to said standard interface.

5. A computer-implemented method comprising:
intercepting a procedure call intended for a first interface that supports standard procedures;
determining from said intercepted procedure call whether said intercepted procedure call is for invoking one of said standard procedures or whether said intercepted procedure call is for invoking a non-standard procedure that is not supported by said first interface;
if determined that said intercepted procedure call is for invoking one of said standard procedures, directing said intercepted procedure call to said first interface; and
if determined that said intercepted procedure call is for invoking said non-standard procedure, directing said intercepted procedure call to a second interface that supports said non-standard procedures; and
analyzing an index value, comprising less bits when identifying said one of said standard procedures than when identifying said non-standard procedure, included in said intercepted procedure call to determine whether said index value identifies said one of said standard procedures or whether said index value identifies said non-standard procedure.

6. The method of claim 5 wherein said intercepting is transparent to a caller initiating said procedure call.

7. The method of claim 5 wherein said first interface comprises a Processor Abstraction Layer (PAL) interface for an INTEL Architecture (IA)-64 processor.

8. The method of claim 5 further comprising:
if determined that said intercepted procedure call is for invoking said non-standard procedure, determining whether said second interface is implemented for supporting said non-standard procedure; and
performing said directing of said intercepted procedure call to said second interface if determined that said second interface is implemented.

9. The method of claim 8 further comprising:
if determined that said intercepted procedure call is for invoking said non-standard procedure and determined that said second interface is not implemented, returning a response to a caller that initiated said intercepted procedure call, said response consistent with a response from said first interface to said intercepted procedure call.

10. A computer-implemented method of obscuring procedure calls, said method comprising:
predefining at least one special index that identifies a non-standard procedure that is not supported by a standard interface, wherein said at least one special index is different than standard indices that identify standard procedures supported by said standard interface;
including an index in a procedure call intended for said standard interface, wherein said index identifies a procedure to be invoked;
intercepting procedure calls intended for said standard interface;
determining whether a special index is included in an intercepted procedure call; and
if determined that said special index is included in said intercepted procedure call, directing said intercepted procedure call to a non-standard interface that supports said non-standard procedure identified by said special index included in said intercepted procedure call; and
wherein said at least one special index comprises more bits than bits included in said standard indices.

11. The method of claim 10 wherein said at least one special index is larger in value than said standard indices.

12. The method of claim 10 further comprising:
if determined that a special index is not included in said intercepted procedure call, directing said intercepted procedure call to said standard interface.

13. A computer-implemented method of obscuring procedure calls, said method comprising:
predefining at least one special index that identifies a non-standard procedure that is not supported by a standard interface, wherein said at least one special index is different than standard indices that identify standard procedures supported by said standard interface;
including an index in a procedure call intended for said standard interface, wherein said index identifies a procedure to be invoked;
intercepting procedure calls intended for said standard interface;
determining whether a special index is included in an intercepted procedure call;
if determined that said special index is included in said intercepted procedure call, directing said intercepted procedure call to a non-standard interface that supports said non-standard procedure identified by said special index included in said intercepted procedure call;
selecting a pseudo-random base number generated by a random number generator;
assigning an offset value for each non-standard procedure for which support is desired; and
including in a procedure call an index equal to a sum of said pseudo-random base number plus a corresponding offset assigned to a desired non-standard procedure for invoking said desired non-standard procedure.

14. A system comprising:
at least one processor;
Processor Abstraction Layer (PAL) interface for supporting standard PAL procedures;
a non-standard interface for accessing at least one non-standard procedure that is not natively supported by said PAL interface; and
an interposer for intercepting procedure calls made to said PAL interface and determining whether an intercepted procedure call is for invoking one of said standard PAL procedures or for invoking one of said at least one non-standard procedure, wherein if said intercepted procedure call is for invoking one of said standard PAL procedures said interposer directs said intercepted procedure call to said PAL interface and wherein if said intercepted procedure call is for invoking one of said at least one non-standard procedure said interposer directs said intercepted procedure call to said non-standard interface;

an index, comprising less bits when identifying said one of said standard PAL procedures than when identifying said one of said at least one non-standard procedure, included in said intercepted procedure call to identify a procedure to be invoked; and wherein said interposer determines from said index whether said index identifies said one of said standard PAL procedures or said one of said at least one non-standard procedure.

15. The system of claim 14 wherein said standard PAL procedures include at least one procedure for accessing a first cache, and wherein said at least one non-standard procedure includes a procedure for accessing an additional cache that is not supported by said PAL interface.

* * * * *

UNITED STATES PATENT AND TRADEMARK OFFICE
CERTIFICATE OF CORRECTION

| | |
|---|---|
| PATENT NO. | : 7,512,956 B1 |
| APPLICATION NO. | : 10/640765 |
| DATED | : March 31, 2009 |
| INVENTOR(S) | : Martin O. Nicholes et al. |

Page 1 of 1

It is certified that error appears in the above-identified patent and that said Letters Patent is hereby corrected as shown below:

In column 16, line 60, in Claim 1, after "at least" insert -- one --.

Signed and Sealed this

Twenty-first Day of July, 2009

JOHN DOLL
*Acting Director of the United States Patent and Trademark Office*